April 23, 1968   E. COCHRAN   3,379,147
MINT PLANTER

Filed Aug. 8, 1966   3 Sheets-Sheet 1

Edgar Cochran, INVENTOR.

BY
Attorney

April 23, 1968  E. COCHRAN  3,379,147
MINT PLANTER

Filed Aug. 8, 1966  3 Sheets-Sheet 2

Edgar Cochran, INVENTOR.

BY

Attorney

April 23, 1968   E. COCHRAN   3,379,147
MINT PLANTER

Filed Aug. 8, 1966   3 Sheets-Sheet 3

Edgar Cochran, INVENTOR.

BY
Attorney

United States Patent Office 3,379,147
Patented Apr. 23, 1968

3,379,147
MINT PLANTER
Edgar Cochran, Royal City, Wash. 99357
Filed Aug. 8, 1966, Ser. No. 570,838
2 Claims. (Cl. 111—2)

My invention relates generally to an agricultural machine to plant elongate roots and more particularly to such a device that is particularly adapted to plant the vegetatively reproducing portions of the perineal herb mint.

Implements to plant reproducing units of various plants have heretofore become well known and used in commerce. Some such devices are adapted to transplant individual plants while others are adapted to handle some reproducing portion in a gross homogeneous fashion. Because of the peculiar nature and requirements of each specie of plant, machines adapted to plant one are generally not usable, or at least not effectively usable, to plant another.

The Laviatae or mint family of herbaceous plants is commonly cultivated in temperate regions of North America to obtain essential oils which these plants produce; the species Mentha tiperita, or common mint, is particularly cultivated for the oil of peppermit which it produces. This plant, as other members of the family, is commonly propagated by the planting of pieces of elongate root and stem of previously developed plants in loose, prepared soil beds, at a depth of some one to four inches, with compaction of the covering soil after implantation. Heretofore, all or a substantial portion of this planting process has been accomplished by hand work, usually in the Western States with the aid of Mexican labor. This hand planting has proceeded at approximately the rate of one acre per workman per day and has, therefore, been a laborious, expensive process.

With this background in mind, the instant invention seeks to provide a mechanical means of planting mint, and in so doing it is:

A principal object of my invention to provide a mechanical mint planter that will accept a homogeneous mass of mint roots and stems and establish them in properly implanted fashion in the earth.

A further object of my invention is to provide such a device that implants mint mechanically at a much more rapid rate than could be accomplished by hand labor.

A further object of my invention is to provide such a device that creates a loosened implanting, places the roots over this bed, covers them with loose soil and compacts this soil over the implanted mint, all in a fashion adapted to promote growth of the implanted product.

A still further object of my invention is to provide a device of the nature aforesaid that may be readily propelled about a field to be implanted with mint by ordinary wheel tractors or similar prime movers of argricultural commerce.

A still further object of my invention is to provide an oscillating armature in mint root storage bins adapted to segregate the root for proper implantation and remove embedded dirt without fouling the implanting mechanism.

A still further object of my invention is to provide such a device that has an an implanting wheel with an adjustable number of implanting teeth to regulate amount of mint planted per unit area.

A still further object of my invention is to provide such a device that is of new and novel design, of simple and economic construction, of rugged and durable nature, and otherwise well adapted to fulfill the purposes for which is is intended.

These and other objects of my invention will become apparent from consideration of the following specification and accompanying drawings which form a part of this application. In carrying out the objects of my invention, however, it is to be understood that its essential features are susceptible to changes in design and structural arrangement, with only one preferred embodiment being illustrated and described, as required.

In the accompanying drawings wherein like numbers of reference refer to similar parts throughout:

Figure 1:
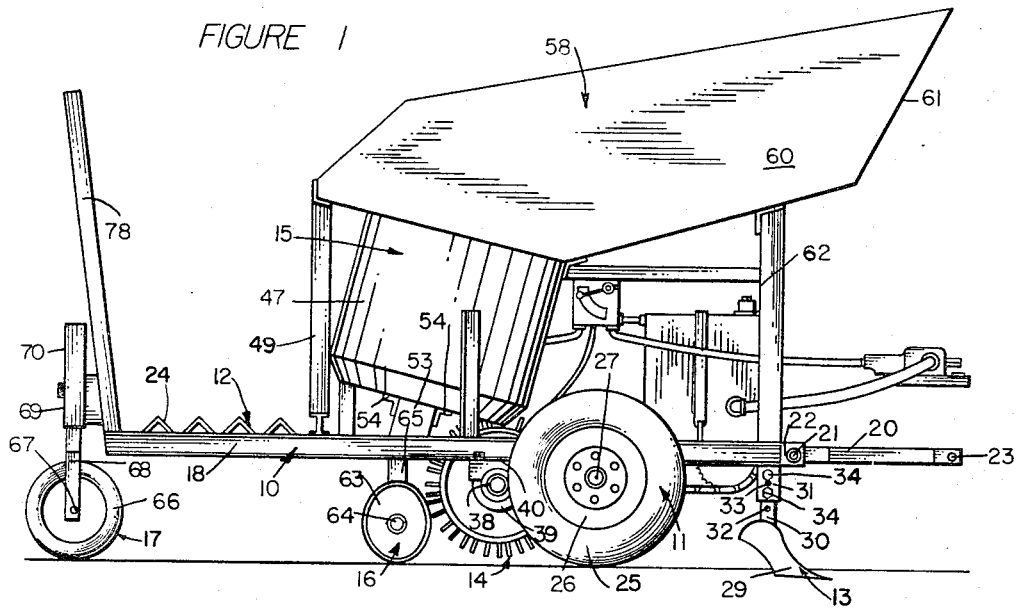
FIGURE 1 is an orthographic side view of my entire invention showing its parts, their configuration and relationship.
Figure 2:
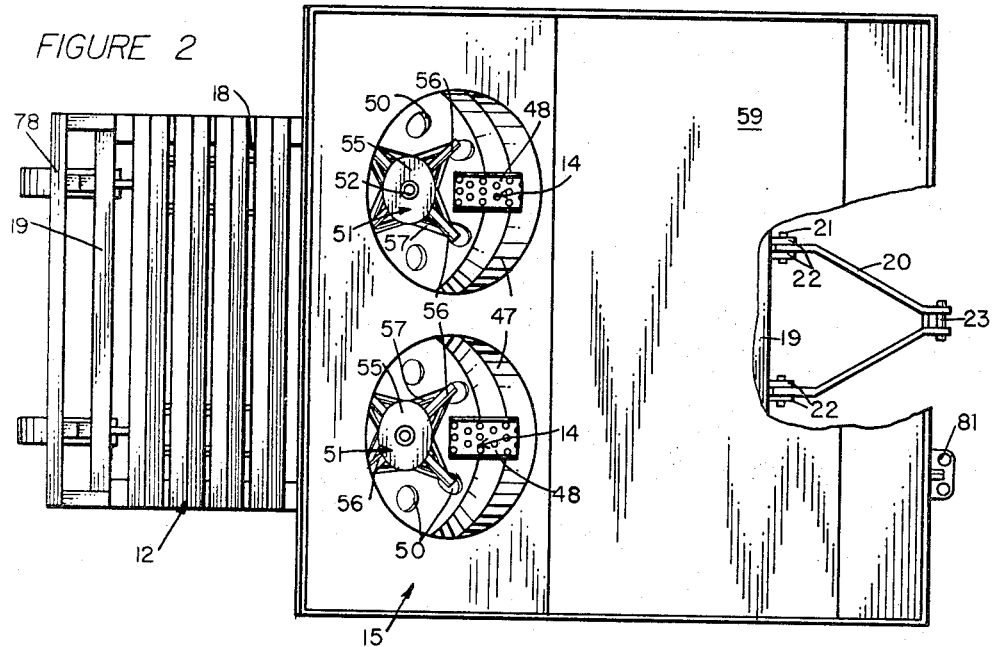
FIGURE 2 is an othographic top view of the same invention as shown in FIGURE 1, showing the details from this aspect.

Referring now to the drawings in more detail and particularly to that of FIGURE 1, it will there be seen that my invention includes, generally, principal frame 10, provided for locomotion by depending wheels 11, in turn supporting operation deck 12, forward digging plow 13, medial planting disks 14 with auxiliary root storage facilities 15 thereabove, rearward covering disks 16 and rearwardmost packing wheels 17. The entire invention is adapted to be moved by and its hydraulic operating systems powered by an independent prime mover (not shown).

Principal frame 10 is formed with peripheral side members 18 and end cross members 19. It is provided in its forward part with hitch 20, pivotably communicating with cross member 19 by pin 21 extending between ears 22 mounted on the cross member and through hitch 20. The forward part of the hitch carries draw pin 23 adapting the member to communicate with ordinary prime movers of agricultural commerce, preferably a wheel tractor.

The rearward portion of the frame is provided with operation deck 12, formed by L shaped angle irons 24 rigidly fastened between side members 18 with space therebetween to prevent clogging with dirt or debris. For economy and rigidity, this frame is preferably formed from steel structural members rigidly joined by welding.

Figure 3:
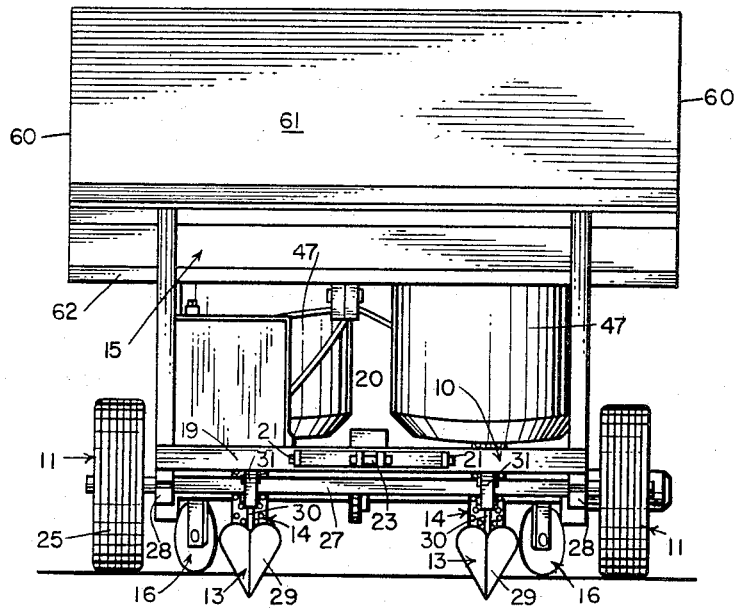
FIGURE 3 is an orthographic front view of the same invention shown in FIGURE 1, again showing its details from this aspect.

As illustrated especially in FIGURE 3, wheels 11 have pneumatic tires 25 mounted upon rims 26 removably carried upon shaft 27 rotatably journaled in paired opposed bearings 28 depending from the medial portion of principal frame 10. Since wheels 11 merely provide means of locomotion for the machine and are not powered, it is immaterial whether they rotate relatively to shaft 27, so long as there exists some means of rotation between tire 25 and principal frame 10.

Forward plow 29 is a wedged, curved member symmetrical about a central vertical axis, of a design well known in the agricultural arts. It is rigidly affixed to vertically upwardly extending plow support 30 slideably communicating within the central channel of support bracket 31, structurally depending from the forward part of principal frame 10. A plurality of holes 32 are provided in plow support 30 adapted to cooperate with a plurality of similar spaced holes 33 provided in support bracket 30, so that bolts 34 may be extended therethrough to adjustably vertically position plow 29 with respect to principal frame 10. In a two-row planter, as illustrated, two such digging plows 13 will be provided at spaced distances according to the desired distance between rows of mint.

Figure 5:
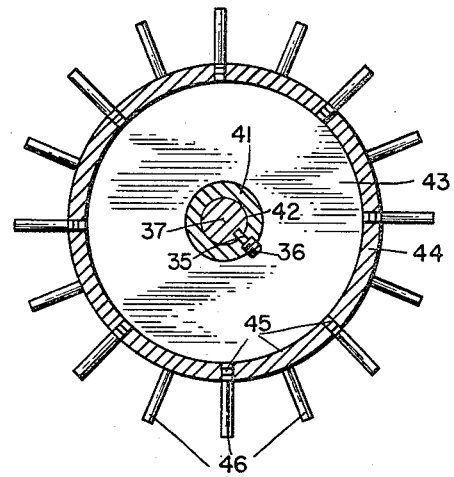
FIGURE 5 is an enlarged, orthographic cross-sectional view of the toothed planting wheel of my invention, showing especially the tooth detail.
Figure 6:
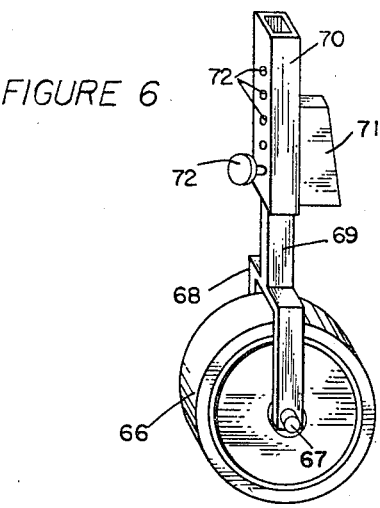
FIGURE 6 is a partial isometric view of a packing wheel and its ancillary operating structures.

Planting wheels 14, as shown in gross in FIGURE 1 and detail in FIGURE 5, are irrotatably carried by means of key 35 and screw 36 upon planting wheel shaft 37. Shaft 37 is rotatably journaled perpendicular to frame side members 18 by paired, opposing bearings 38 dependingly carried by the side members. Preferably, bearings 38 are releaseably fastened by U-bolts 39 so that blocking 40 may be placed between the adjacent surfaces of the bearing and frame 10 to adjust the position of planting wheels 14 relative to principal frame 10, if necessary.

The planting wheel itself is formed with central hub 41 having central bore 42 adapted to receive shaft 37 and medial web 43 communicating with band-like peripheral rim 44. The peripheral rim has a plurality of spaced holes 45 having internal threads adapted to threadedly receive studs 46. Studs 46 are releaseably positioned by screwing into the rim and in this fashion are changeable as to position and array, replaceable and adjustable as to the total number in the rim 44. The overall dimensioning of wheel 14 and studs 46 should be such that when pneumatic tires 25 are resting on a supporting surface, the vertically downwardmost projection of studs 46 will be somewhat above this surface as indicated in the side elevation of FIGURE 1, to allow root carried thereby to pass downwardly therefrom by action of gravity.

Above planting wheel 14 is planting hopper 47. This is a cylindrical, barrel-like member positioned with its axis of symmetry slightly angled to vertical with the lower portion rearward of the upper portion but with its axis in the same plane as a diameter of planting wheel 14 so that at least the studs 46 of the planting wheel may project into the lower forward medial area of the hopper 47 through the orifice 48 provided therefor. This structure causes roots carried in the hopper to feed to orifice 48 by gravity. Hopper 47 is held in this position by secondary frame members 49 communicating between hopper 47 and principal frame 10. A plurality of spaced holes 50, of a size appropriate to allow passage of dirt and clods therethrough but prevent the passage of elongate mint roots, are provided in the bottom of the planting hopper.

Axially aligned within the hopper is rotor 51 irrotatably communicating by shaft 52 to hydraulic motor 53 mounted on the lower outer surface of hopper 47 by brackets 54. The hopper rotor itself comprises central disk 55 irrotatably carried on shaft 52, in turn carrying radially outwardly projecting rod-like arms 56 supported against displacement by angled braces 57. An appropriate hole is provided in the bottom of planting hopper 47 to permit passage of shaft 52 therethrough and unencumbered rotation of this member within hopper 47. The dimensioning and positioning of hopper rotor 51 relative to the upward projection of planting wheel 14, within the hopper 47, must be such as to permit the motion of each without interference with the other.

Immediately above planting hopper 47 and structurally communicating therewith is box-like storage hopper 58, having bottom 59, provided with openings communicating with the planting hopper, sides 69 and forward end 61. This member is supported by vertical secondary frame members 49 and horizontal secondary frame members 62. The structure of this member is not particularly critical so long as it will store and maintain for use surplus root to be planted, but I do prefer to slope the bottom member as indicated so there is a natural tendency of stored product to pass into or towards the planting hoppers 47; since relatively large quantities of mint root must be planted per unit area, it is desirable that the member be of a size sufficient to carry usable quantities of root.

Immediately rearward of planting wheels 14 is the covering disk structure, including circular cupped disk 63, common in agricultural commerce, rotatably journaled on axle 64 carried by disk arm 65, depending from structural communication with the principal frame 10 as illustrated in FIGURE 1. This disk is disposed with its axis of rotation at a slight angle to the normal line of progress of the principal frame 10 so that when the disk communicates with the earth therebelow, it will have a tendency to push the earth against its inner surface inwardly to cover mint root planted by the planting wheel 14. I have found that one such disk on one side and rearward of the planting wheel 14 is sufficient to provide cover for normal mint planting in the northwestern part of the United States; however, if more soil coverage of the plant be required, a coverage disk structure as described may be placed on each side of planting wheel 14 to provide greater depth of soil coverage.

Rearwardly of the covering disks is the packing wheel structure with relatively wide packing wheel 66 rotatably journaled upon axle 67 carried by vertical wheel yoke 68. The wheel yoke slidably communicates in its upper part by shaft 69 with shaft channel 70 projecting structurally from principal frame 10 by fillet 71. The upper shaft 69 of wheel yoke 68 is adjustably carried in shaft channel 70 by adjustment stud 72 extending therebetween. A plurality of spaced threaded holes 73 are provided in shaft channel 70 to threadedly receive adjustment stud 72 and allow it to operatively communicate with shaft 69 to adjustably position this member within shaft channel 70.

This mechanical arrangement thus regulates, within limits, the vertical positioning of packing wheel 66 relative to principal frame 10. In this regard it is further to be noted that, since upon variance of the vertical position of packing wheel 66, the entire frame 10 will tend to rotate about a point vertically below the center of wheel axle 27, this operation will also change the vertical orientation of the digging plow, planting wheel and covering disk.

Rearward of the operator platform 12, formed by flooring members 24, is the vertically extending operator safety rail 78, adapted to prevent an operator from falling in a rearward direction off the operating platform.

Figure 7:
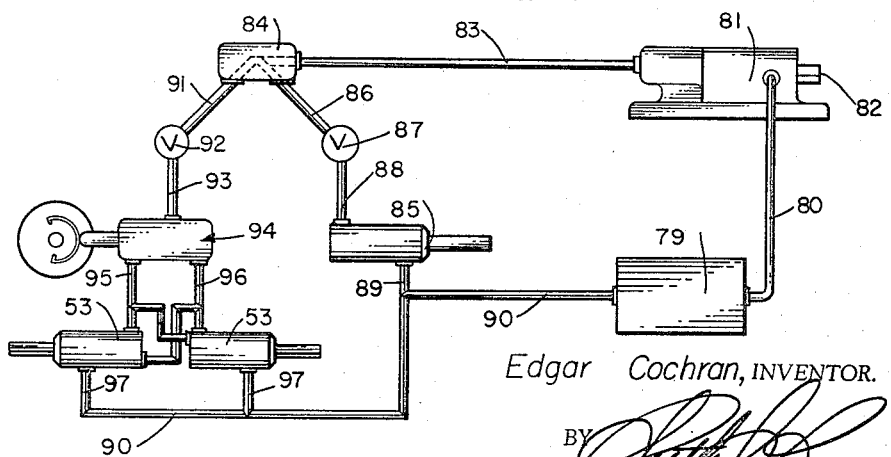
FIGURE 7 is a diagrammatic representation of the hydraulic operating system of my invention in ordinary symbology.

The hydraulic operating system of my invention is shown bestly in the diagram of FIGURE 7. The hydraulic system is supplied with hydraulic fluid by reservoir 79 communicating by lead 80 to pump 81 which pressurizes the fluid in response to power supplied to drive shaft 82 of the pump by the prime mover (not shown) that propells the entire planting machine. This pressurized fluid passes through lead 83 to divider 84 from whence it passes in two parallel circuits, one through hopper motor 53 and the other through planting wheel motor 85. The planting wheel circuit communicates by lead 86 in series through regulating valve 87 and thence by lead 88 to planting wheel motor 85. Lead 89 communicates back to the common return 90 to return the fluid again to reservoir 79.

The other outlet of dividing valve 84 communicates by lead 91 in series through regulating valve 92 and thence lead 93 to reversing switch 94. The reversing switch then communicates by leads 95 to one side of hopper motors 53 and by lead 96 to the other side of these motors, so that fluid flowing in these two circuits will produce motion in opposite directions. From hopper motors 53 exhaust leads 97 communicate to the common return 90 to complete this circuit.

Figure 4:
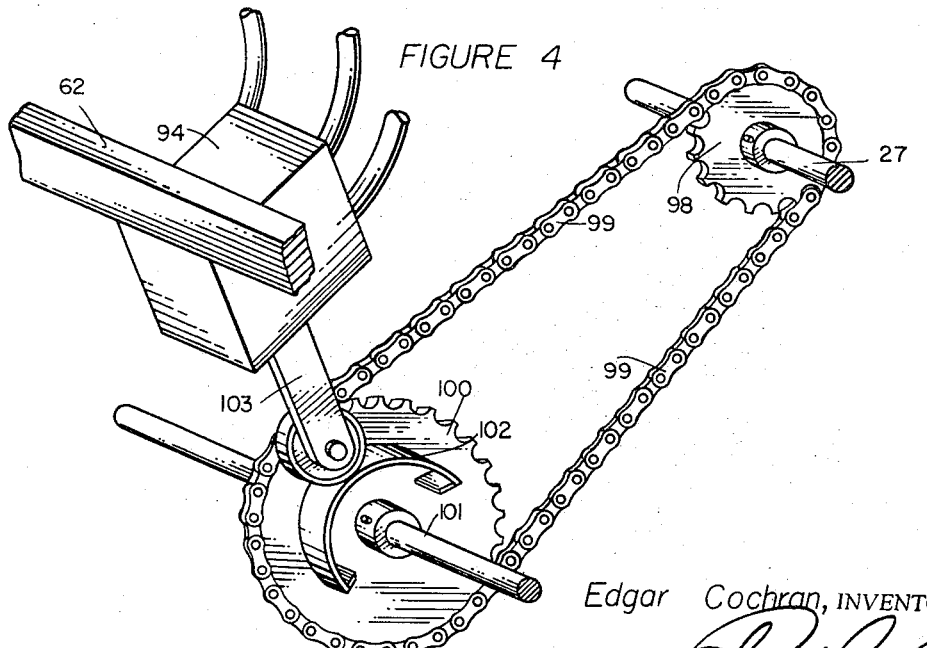
FIGURE 4 is a partial isometric view of the armature reversing valve and associated operating mechanism.

The reversing valve structure of the hopper motors 53 is illustrated in detail in the enlarged partial isometric drawing of FIGURE 4. Here it is seen that sprocket 98 irrotatably carried by wheel shaft 27 operatively communicates by roller link chain 99 with sprocket 100 carried on jack shaft 101 rotatably mounted by appropriate journaling on principal frame 10. Sprocket 100 has half-circular, laterally projecting cam plate 102 adapted to engage cam follower 103 of reversing valve 94 structurally carried by secondary frame member 62 on principal frame 10. The reversing valve is adapted by motion of cam follower 103 to pass flow in one direction when activated and in the other direction when not activated by appropriate position of cam plate 102; such valves are well known and commercially available. With this structure, then, upon a predetermined rotation of wheels 11, hopper rotor 51 will change its rotation in one direction to rotation in the other direction so the rotation in one or the other direction will be continuous. This operation is particularly desirable, and in fact oftentimes necessary because of the nature of mint roots, to prevent their fouling and matting within planting hoppers 47.

With the foregoing description of my invention its operation can now be understood.

The device is constructed according to the foregoing specification and a supply of mint root deposited in storage hopper 58. A prime mover, preferably an ordinary wheel tractor of agricultural commerce (not shown), is connected by draw pin 23 to hitch 20 and the drive shaft 82 of pump 81 is operatively connected to the power take-off of this prime mover. The hydraulic adjustment valves 92, 87 are appropriately regulated to determine proper speed of hydraulic motors 53, 85 and the device is propelled to operative planting position in a field to be planted. The machine is then propelled along the rows to be planted with an operator positioned on operating deck 12 to manually move root from storage hopper 58 into planting hoppers 47. The root passes by gravity to the lower unoccupied portion of planting hopper 47 and at least the lower portion of the root mass is moved rotatably in the hopper by physical communication of rotor 51 therewith. This motion of root within the planting hopper causes a portion of it to pass over the upper part of planting wheel 14, projecting through the hopper bottom, and by reason of physical communication of studs 46 of the planting wheel with the root, a portion of it will be moved by the planting wheel in the direction of its rotation. The planting wheel is adapted by its motor 85 to rotate with its upper portion moving rearwardly so that the root carried thereby will pass rearwardly and downwardly corresponding to the motion of this wheel. As the root approaches the lowermost portion of its path, it will be acted upon by gravity, and since the downwardmost projections of planting wheel 14 are above the ground level immediately therebelow, the root will fall into the ground below the planting wheel.

While root was passing along the course described the entire planter was moving in a forward direction; since the plows 29 were engaged under the surface of the ground during this motion a furrow with loosened dirt will exist below the planting wheels 14 making a bedding surface for the root deposited thereby.

As the covering disks pass forwardly laterally near the mint root deposited by the planting wheels, dirt will be pushed back over the then existing furrow to cover all or part of the mint root therein. After passage of the covering dsik, the same area will be presented to packing wheel 17. This wheel will have been adjusted to present some force, in reaction to the weight of the machine, on the surface immediately therebelow and by reason of this construction will compact the earth over the planted mint root to finalize the creation of an appropriate planting bed.

Obviously a mechanical feed could be used to transmit stored root from storage hopper 58 to planting hoppers 47, but in operation of my machine I have found this to be not desirable. Mint roots are of such an alongate, gnarled structure as to compact and foul most readily and they generally have a good bit of contained and carried earth, glass, humus and the like which further aid in the fouling process. In view of this, it has been found necessary to use some discretion in feeding planting hoppers 47 and on occasion to unsnarl them, so it is desirable to manually feed this hopper.

The structures and operations described are for one series of planting elements but obviously by mere multiplication at laterally spaced distances a plurality of such components could be combined to form a multi-row planter. In fact, in the accompanying drawings a two-row type is illustrated. I have found the two-row version to be particularly useful in conjunction with manual operation as one operator can conveniently feed only two hoppers. Obviously, however, the structure could be multiplied according to my disclosure to plant any desired number of rows.

It is to be noted from the foregoing description that the construction and operation of my machine is particularly adapted to use with planting of members of the Laviatae family and particularly with the peppermint species. The pecularities of the growing habits of this family and the nature of its roots largely determine both structure and operation of my machine. It could, of course, be used with other vegetative matter having like or similar properties.

The foregoing description is necessarily of a detailed character so that a specific embodiment of my invention may be set forth as required, but it is to be understood that various rearrangements of parts, multiplications thereof and modifications thereof and modifications of detail may be resorted to in connection with the invention without departing from its spirit, essence or scope.

Having thusly described my invention, what I desire to protect by Letters Patent, and

What I claim is:

1. An agricultural implement for the planting of root material of the nature aforesaid, comprising, in combination:
   a principal frame adapted for locomotion by medially depending wheels and having a forwardly projecting hitch and rearwardly disposed operating platform;
   a forward digging plow adjustably depending from the forward portion of said frame member adapted to dig a furrow in earth therebelow upon forward motion of said frame relative thereto;
   a planting disk, rotatably carried by said principal frame, disposed rearwardly of said digging plow, including a flat surfaced wheel having a plurality of threaded holes carrying a plurality of radially projecting studs threadedly engaged therein, the lowermost projection of said studs being vertically above the surface supporting said principal frame;
   root storage facilities associated with said planting disk, including a cylindrical planting hopper disposed above said planting wheel so as to allow rotatable projection of at least the stud portion of said wheel therein, said cylinder having an axially aligned hopper rotor therein adapted to periodically move rotatably in one direction and thereupon in the opposite direction in cycles of predetermined length by a cog carried by the wheel axle operatively communicating with a second cog carried on a jack shaft rotatably journaled upon the frame and having a cam member thereon operatively communicating with a cam follower carried by a reversing valve adapted to permit fluid flow in one direction when activated by said cam member and in the opposite direction when not so activated and a storage hopper operatively communicating with the planting hopper;
   a covering disk disposed rearwardly and laterally of said planting disk adapted to cover material deposited by said planting disk;

a vertically adjustable packing wheel depending from said frame immediately rearwardly of said covering disk adapted to compact soil above planted mint; and means of supplying motive power to the implement.

2. The invention of claim 1 wherein motive power for said planting disk and said hopper rotors is supplied by hydraulic motors adjustably communicating with a hydraulic pump powered by means external to said machine.

References Cited

UNITED STATES PATENTS

| | | | |
|---|---|---|---|
| 1,972,325 | 9/1934 | Acasio | 111—3 |
| 2,715,882 | 8/1955 | Overstreet | 111—3 |
| 2,889,959 | 6/1959 | Landgraf | 111—3 X |
| 3,026,001 | 3/1962 | Landgraf | 111—3 X |
| 3,187,698 | 6/1965 | Murray | 111—2 |
| 3,257,977 | 6/1966 | Overstreet | 111—3 |

ROBERT E. BAGWILL, *Primary Examiner.*